United States Patent
Otsuka et al.

(10) Patent No.: US 6,963,015 B2
(45) Date of Patent: Nov. 8, 2005

(54) ETHYLENE-HEXAFLUOROPROPYLENE COPOLYMER ELASTOMER

(75) Inventors: Masao Otsuka, Settsu (JP); Mitsuo Tsukamoto, Settsu (JP); Mitsuhiro Otani, Settsu (JP); Tatsuya Morikawa, Settsu (JP); Hideya Saito, Settsu (JP)

(73) Assignee: Daikin Industries, LTD, Osaka (JP)

( * ) Notice: Subject to any disclaimer, the term of this patent is extended or adjusted under 35 U.S.C. 154(b) by 215 days.

(21) Appl. No.: 10/381,708

(22) PCT Filed: Sep. 19, 2001

(86) PCT No.: PCT/JP01/08131
§ 371 (c)(1),
(2), (4) Date: Mar. 27, 2003

(87) PCT Pub. No.: WO02/31006
PCT Pub. Date: Apr. 18, 2002

(65) Prior Publication Data
US 2004/0030049 A1 Feb. 12, 2004

(30) Foreign Application Priority Data
Oct. 6, 2000 (JP) .................................. 2000-308069
Apr. 12, 2001 (JP) .................................. 2001-113799

(51) Int. Cl.$^7$ .................. C07C 17/02; C08F 114/18
(52) U.S. Cl. .................. 570/125; 570/126; 526/254; 526/255; 525/326.2; 525/326.3
(58) Field of Search .................. 570/125, 126; 526/254, 255; 525/326.2, 326.3

(56) References Cited

U.S. PATENT DOCUMENTS 5,650,472 A    7/1997    Tatemoto et al.

FOREIGN PATENT DOCUMENTS

GB         1441530 A      7/1976

OTHER PUBLICATIONS

International Search Report for PCT/JP01/08131 dated Dec. 18, 2001.
English language translation of International Preliminary Examination Report for PCT/JP01/08131 dated Aug. 5, 2002.

*Primary Examiner*—Samuel Barts
*Assistant Examiner*—Sikarl A. Witherspoon
(74) *Attorney, Agent, or Firm*—Sughrue Mion, PLLC

(57) ABSTRACT

The present invention provides an ethylene-hexafluoropropylene copolymer which is suitable as a hose or seal for engine oil of an automobile and has sufficient amine resistance, while maintaining heat resistance, oil resistance and chemical resistance close to that of conventional fluorine rubber. The ethylene-hexafluoropropylene copolymer comprises 35 to 60% by mole of ethylene structural unit, 25 to 50% by mole of hexafluoropropylene structural unit and 0 to 15% by mole of structural unit derived from a monomer copolymerizable therewith and has a fluorine content of at least 60% by weight and number average molecular weight of 3,000 to 500,000.

7 Claims, No Drawings

ETHYLENE-HEXAFLUOROPROPYLENE COPOLYMER ELASTOMER

TECHNICAL FIELD

The present invention relates to a new elastomeric copolymer comprising an ethylene structural unit and a hexafluoropropylene (HFP) structural unit as fundamental structural units and having a high fluorine content. Further, the present invention relates to a vulcanizable composition obtained by using this copolymer and an elastomeric vulcanizate which is excellent in heat and oil resistance and suitable as oil seal material.

BACKGROUND ART

The copolymer of ethylene (E) and hexafluoropropylene (HFP) exhibits elastomeric properties and is excellent in heat resistance, oil resistance and chemical resistance (particularly alkali resistance), just as other fluorine resin and elastomers are. The copolymer also has electrically favorable properties such as high insulation, low dielectric loss tangent and dielectric constant and low frequency dependency. Particularly, the copolymer is expected to do well as oil seal material for an automobile as it is excellent in amine and oil resistance and when using in this way, small swelling to oil is desired. In order to obtain such advantageous properties, various E-HFP copolymers have been developed (JP-A-49-31785, JP-A-49-83738, JP-A-49-83789, JP-A-49-133442, JP-A-50-83440, JP-A-50-145457, JP-B-50-15304, U.S. Pat. No. 2,549,935, U.S. Pat. No. 4,039,595, Journal of the Chemical Society of Japan, 1980, (1), page 112 to 120, and J. Polym. Sci., IX, No. 6, page 481 to 492 (1952)).

For example, JP-A-49-31785 describes that E-HFP copolymer becomes elastomeric when the ethylene content of the E-HFP copolymer is at most 5 mole based on 1 mole of HFP. However, only a copolymer containing at least 78% by mole of ethylene (fluorine content is 45.7% by weight, HFP content is at most 22% by mole) is disclosed in the Examples.

JP-A-49-83738, JP-A-49-83789, JP-A-49-133442, JP-A-50-83440, JP-A-50-145457 and JP-B-50-15304 also describe that a copolymer containing 10 to 50% by mole of HFP is preferable. However, the HFP content of the E-HFP copolymer described specifically in these publications (see Example 2 of JP-A-49-83738) is at most 36.9% by mole (fluorine content 57.6% by weight).

U.S. Pat. No. 2,549,935 describes that a copolymer containing 5 to 50% by mole of HFP is worth noting but merely an E-HFP copolymer containing 37.5% by mole of HFP is obtained in the Example.

U.S. Pat. No. 4,039,595 teaches an E-HFP copolymer which is an oily matter having a high viscosity with low or medium molecular weight containing 15 to 50% by mole of HFP. However, only an E-HFP copolymer which is an oily matter containing 40% by mole of HFP (fluorine content is 59.4% by weight) is obtained in the Example.

Journal of the Chemical Society of Japan, 1980, (1), page 112 to 120 reports preparing an E-HFP copolymer variously changing the charging amount of HFP and polymerization conditions and concludes that a E-HFP copolymer containing at least 50% by mole of HFP cannot be obtained. Thus merely a copolymer containing 39.8% by mole of HFP (fluorine content is 59.3% by weight, Experiment EF-12) was obtained at highest according to the Experiment Results (Table 2 and FIG. 1).

In this Experiment EF-12, the intrinsic viscosity (molecular weight) is presumed to be low and the Mooney viscosity ML (1+4, 100° C.) is presumed to be at most 50. As described in the reference, when the HFP content increases or the Mooney viscosity decreases, the tensile strength of the vulcanizate tends to decrease. From all of the above, in Experiment EF-12, vulcanization properties such as tensile strength when peroxide vulcanization is conducted are presumed to be insufficient for practice.

WO 94/24175 pamphlet describes an ethylene-HFP-TFE copolymer. However, the copolymer with the highest fluorine content described in the Examples has a fluorine content of 57.5% by weight (Example 4) and the properties of the vulcanizate (for example chemical resistance) are insufficient.

J. Polym. Sci., IX, No. 6, page 481 to 492 (1952) discloses an experiment of conducting emulsion polymerization by charging HFP and ethylene at a weight ratio of 50/18. However, the obtained copolymer was reported to have an HFP content of 7.6% by mole and a fluorine content of 23.1% by weight and to be an elastic body with low molecular weight and inferior mechanical strength.

In this way, attempts to prepare an E-HFP copolymer with a high HFP content have been made in the past. However, in reality, a copolymer comprising ethylene and HFP and also having a fluorine content of at least 60% by weight did not exist.

The present invention aims to provide an ethylene-hexafluoropropylene (E-HFP) copolymer comprising ethylene and hexafluoropropylene and containing at least 60% by weight of fluorine.

In addition, the present invention aims to provide a vulcanizable composition obtained by using the E-HFP copolymer and an elastomeric vulcanizate obtained from the vulcanizable composition, which has a small swelling ratio and thus particularly useful as sealing or hose material for an automobile.

DISCLOSURE OF INVENTION

The present invention relates to an E-HFP copolymer comprising 35 to 60% by mole of ethylene structural unit, 25 to 50% by mole of HFP structural unit and 0 to 15% by mole of structural unit derived from a monomer copolymerizable therewith and the E-HFP copolymer has a fluorine content of at least 60% by weight and a number average molecular weight of 3,000 to 500,000.

The present invention also relates to a vulcanizable composition comprising the E-HFP copolymer and a vulcanizing agent and an elastomeric vulcanizate obtained by vulcanizing the vulcanizable composition, particularly used as sealing material or hose material for an automobile.

BEST MODE FOR CARRYING OUT THE INVENTION

As mentioned above, the E-HFP copolymer of the present invention is an E-HFP copolymer comprising 35 to 60% by mole of ethylene structural unit, 25 to 50% by mole of HFP structural unit and 0 to 15% by mole of structural unit derived from a monomer copolymerizable therewith, the E-HFP copolymer having a fluorine content of at least 60% by weight and a number average molecular weight of 3,000 to 500,000.

When the number average molecular weight is 3,000 to 10,000, an appropriate functional group can be introduced and the copolymer can be used as liquid rubber. When the molecular weight is represented by Mooney viscosity (1+4, 100° C.), the Mooney viscosity (1+4, 100° C.) is preferably within the range of 60 to 200 from the viewpoint that tensile strength is high and kneading is easy regarding the vulcanizate. More preferably, the Mooney viscosity (1+4, 100° C.) is within the range of 100 to 200.

Examples of the other monomers copolymerizable with ethylene and HFP are one member or at least two members of tetrafluoroethylene (TFE), chlorotrifluoroethylene (CTFE), perfluoro(alkyl vinyl ether) (PAVE), trifluoroethylene, vinyl fluoride and propylene. TFE and CTFE are particularly preferable in that productivity can be improved.

The copolymerization ratio of the ethylene/HFP/other monomer is 35 to 60/25 to 50/0 to 15% by mole, more preferably 45 to 60/35 to 50/0 to 10% by mole. Furthermore, most preferably, ethylene/HFP/TFE is 45 to 60/35 to 50/0 to 10% by mole from the viewpoint that polymerization productivity is good and the molecular weight can easily be raised.

The E-HFP copolymer of the present invention has a large fluorine content of at least 60% by weight, preferably at least 61% by weight.

The E-HFP copolymer of the present invention can be prepared by a usual radical polymerization method. Any of emulsion polymerization, suspension polymerization, solution polymerization or bulk polymerization may be employed as the polymerization method, but emulsion polymerization is advantageous because it is industrially easy to carry out and a polymer having a high molecular weight can be easily obtained.

As the radical polymerization initiator used in radical polymerization, organic or inorganic peroxide, persulfate or an azo compound can be used.

Examples of the organic peroxide are dialkyl peroxide such as 2,5-dimethyl-2,5-bis(t-butylperoxy)hexane and di-t-butyl peroxide; diacyl peroxide such as isobutyl peroxide, 3,5,5-trimethylhexanoyl peroxide, octanoyl peroxide, lauroyl peroxide, stearoyl peroxide and succinic acid peroxide; peroxydicarbonate such as dinormalpropyl peroxydicarbonate, diisopropyl peroxydicarbonate, bis(4-t-butylcyclohexyl) peroxydicarbonate, di-2-ethoxyethyl peroxydicarbonate, di-2-ethylhexyl peroxydicarbonate and di-2-methoxybutyl peroxydicarbonate; peroxyesters such as 1,1,3,3-tetramethylbutyl peroxyneodecanoate, 1-cyclohexyl-1-methylethyl peroxyneodecanoate, t-hexyl peroxyneodecanoate, t-butyl peroxyneodecanoate, t-hexyl peroxypivalate, t-butyl peroxypivalate, 1,1,3,3-tetramethylbutyl peroxy-2-ethylhexanoate, 2,5-dimethyl-2,5-bis(2-ethylhexanoylperoxy)hexane, 1-cyclohexyl-1-methylethyl peroxy-2-ethylhexanoate, t-hexyl peroxy 2-ethylhexanoate, t-butyl peroxy 2-ethylhexanoate, t-butyl peroxyisobutylate, t-hexyl peroxyisopropylmonocarbonate, t-butyl peroxy3,5,5-trimethylhexanoate, t-butyl peroxylaurate, t-butyl peroxyisopropylmonocarbonate, t-butyl peroxy2-ethylhexylmonocarbonate, t-butyl peroxyacetate, t-butyl peroxybenzoate and cumyl peroxyneodecanoate; hydroperoxides such as p-methane hydroperoxide, diisopropylbenzene hydroperoxide, 1,1,3,3-tetramethylbutyl hydroperoxide, cumene hydroperoxide, t-hexyl hydroperoxide and t-butyl hydroperoxide;

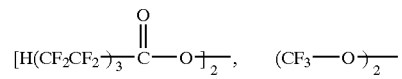

and the like.

Of these, peroxyesters, especially t-butylperoxy pivalate, are preferable from the viewpoint that polymerization rate is high and the molecular weight of the obtained copolymer is high.

Examples of the persulfate are ammonium salt such as ammonium persulfate and alkali metal salt such as potassium persulfate and sodium persulfate. Of these, from the viewpoint of high water solubility, ammonium persulfate is preferable.

An example of the inorganic peroxide is hydrogen peroxide.

Also, peroxide and persulfate can be used in combination with a reducing agent.

Examples of the reducing agents, which form a redox type initiator when used in combination with these, are metal ion, hydroxymethane sulfinate, ethylenediaminetetraacetic acid (EDTA), a salt thereof, water-soluble thiosulfate, sulfite and the like.

Examples of the metal ion are ions of iron, copper, silver, cerium, cobalt and nickel. These are supplied in the form of sulfate, chloride, ammonium sulfate, nitrate and the like.

Ethylenediaminetetraacetic acid (EDTA) may be used in an isolated form but more preferably is used in the form of disodium salt.

As water soluble thiosulfate and sulfite, thiosulfate, sulfite, acidic sulfite and pyrosulfite are preferable.

An example of an especially preferable redox type initiator is a combination using a peroxyester or persulfate as the radical polymerization initiator and iron ion (iron sulfate), EDTA (or a salt thereof) and hydroxymethane sulfinate as the reducing agent. Of these, the combination using t-butylperoxy pivalate (radical polymerization initiator), iron ion (iron sulfate), EDTA (or a salt thereof and hydroxymethane sulfinate is most preferable from the viewpoint that the polymerization reaction rate is high at a low temperature and the molecular weight can be easily adjusted.

The proportion of the radical polymerization initiator and the reducing agent is preferably 1 to 100 mmol/l (concentration in aqueous medium within the emulsion polymerization system; same below), particularly 5 to 50 mmol/l of the radical polymerization initiator, 0.005 to 5 mmol/l, particularly 0.01 to 1 mmol/l of metal ion (metal salt, particularly iron salt), 0.005 to 5 mmol/l, particularly 0.01 to 1 mmol/l of EDTA and 0.5 to 100 mmol/l, particularly 5 to 50 mmol/l of hydroxymethane sulfinate.

By changing the charging amount and ratio of metal (iron) ion and EDTA, the polymerization reaction rate and the molecular weight of the obtained copolymer can be controlled.

Examples of the azo compound are cyano-2-propylazoformamide, 1,1'-azobis(cyclohexane-1-carbonitrile), 2,2'-azobis(2-amidinopropane) dihydrochloride, 2,2'-azobis(2-methylbutyronitrile), 2,2'-azobisisobutyronitrile, 2,2'-azobis(2,4-dimethylvaleronitrile), 2,2'-azobis[N-(2-propenyl)-2-methylpropioneamide], polydimethyl siloxane segment containing macroazo compound, 2,2'-azobis(2,4,4-trimethylpentane), 2,2'-azobis(4-methoxy-2,4-dimethylvaleronitrile), 4,4'-azobis(4-cyanovaleric acid), 2,2'-azobisisobutyric acid dimethyl, 2,2'-azobis[2-(2-imidazolin-2-yl)propane]dihydrochloride, 2,2'-azobis[2-(2- imidazolin-2-yl)propane]disulfate dihydrate, 2,2'-azobis[2-(2-imidazolin-2-yl)propane], 2,2'-azobis{2-methyl-N-[1,1-bis(hydroxymethyl)-2-hydroxyethyl]propionamide}, 2,2'-azobis{2-methyl-N-[1,1-bis(hydroxymethyl)ethyl]propionamide}, 2,2'-azobis{2-methyl-N-(2-hydroxyethyl) propionamide], 2,2'-azobisisobutylamide dihydrate and 2,2'-azobis[2-(hydroxymethyl)propionitrile].

The amount of radical polymerization initiator is 0.001 to 10% by weight, preferably 0.01 to 5% by weight based on the total amount of monomers.

Also, as the polymerization method, iodine migration polymerization (JP-A-53-125491) can be employed. In that case, polymerizing in the presence of a compound represented by formula (I):

R(I)x(Br)y    (I)

(in which R is a saturated or unsaturated divalent fluoro hydrocarbon or chlorofluoro hydrocarbon group having 1 to 16 carbon atoms, or a saturated or unsaturated divalent hydrocarbon group having 1 to 3 carbon atoms, x and y are 0, 1 or 2 and x+y=2) is preferable from the viewpoint that polymerization rate increases.

Example of the compound of formula (I) are 1,3-diiodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1,2-bromo-4-iodoperfluorobutene-1 and various substituted benzenes such as monoiodomonobromo benzene, diiodomonobromo benzene, monoiododibromo benzene, (2-iodoethyl) benzene and (2-bromoethyl) benzene.

Of these, 1,4-diiodoperfluorobutane and diiodomethane are preferable in terms of polymerization reactivity, crosslinking reactivity and easy acquisition.

As other iodine containing monomers, iodine compounds of perfluorovinyl ether such as perfluoro(6,6-dihydro-6-iodo-3-oxa-1-hexene) or perfluoro(5-iodo-3-oxa-1-pentene), which are disclosed in JP-B-5-63482 or JP-A-62-12734, can be copolymerized.

In the case of emulsion polymerization, the polymerization temperature is 0 to 150° C. and the polymerization time is 0.5 to 100 hours.

In the case of emulsion polymerization, polymerized product is generally separated and recovered by coagulation. In this coagulation step, besides so-called salting out which uses metal salt, coagulation may be conducted by adding acid to avoid mixing in metal. The method of coagulation by freezing can also be employed.

The E-HFP copolymer of the present invention obtained in this way has the following properties.
Number average molecular weight (on a polystyrene basis): 3,000 to 500,000
Weight average molecular weight: 5,000 to 2,000,000
Fluorine content: at least 60% by weight
Glass transition temperature: −10 to +15° C.

The E-HFP copolymer of the present invention can be elastomeric or liquid. However, as mentioned later, whichever state the copolymer may be in, the copolymer needs to take on elastomeric properties after vulcanization.

Furthermore, the present invention relates to a vulcanizable composition comprising the aforesaid E-HFP copolymer, vulcanizing agent and an auxiliary vulcanizing agent according to need.

The amount of the vulcanizing agent can be selected according to the type of vulcanizing agent and composition of the copolymer (for example, number of cure site) within the same range as in the past. Usually, based on 100 parts by weight (hereinafter, "parts") the amount is 0.5 to 10 parts. In the same manner, the auxiliary vulcanizing agent can also be selected within the same range as in the past and the amount is usually 0.2 to 10 parts based on 100 parts of the copolymer.

The E-HFP copolymer of the present invention improves amine resistance while maintaining properties of fluorine rubber.

The methods of peroxide vulcanization and radiation vulcanization may be employed for vulcanizing the vulcanizable composition of the present invention.

As the peroxide used as vulcanizing agent in peroxide vulcanization, organic peroxide which easily generates peroxy radical by heat or in the presence of an oxidation reducing agent is preferably used. Specifically, examples are 1,1-bis(t-butylperoxy)-3,3,5-trimethylcyclohexane, 2,5-dimethylhexane-2,5-dihydroperoxide, di-t-butyl peroxide, t-butylcumyl peroxide, dicumyl peroxide, 2,5-dimethyl-2,5-bis(t-butylperoxy)hexane, α,α-bis(t-butylperoxy)-p-diisopropyl benzene, 2,5-dimethyl-2,5-di(t-butylperoxy)-hexyne-3, benzoyl peroxide, t-butyl peroxybenzene, t-butyl peroxybenzoate, 2,5-dimethyl-2,5-di(benzoylperoxy)-hexane, t-butyl peroxymaleic acid, t-butyl peroxyisopropylcarbonate, 1,1-bis(t-butylperoxy)2-methylcyclohexane, 1,1-bis(t-hexylperoxy)cyclohexane, 1,1-bis(t-butylperoxy)3,3,5-triethylcyclohexane, 1,1-bis(t-butylperoxy)cyclohexane, 1,1-bis(t-butylperoxy) cyclododecane, t-hexyl peroxybenzoate, t-butyl peroxyacetate, 2,2-bis(t-butylperoxy) butane, n-butyl-4,4-bis(t-butylperoxy)pentanoic acid, di-t-butyl peroxyisophthalate and 2,5-diethyl-2,5-di(benzoylperoxy)hexane. Of these, dialkyl type and peroxyester type, particularly t-butyl peroxybenzoate and dicumyl peroxide are preferable.

The amount of the organic peroxide can be accordingly determined with consideration to the amount of active —O—O— bonds within the organic peroxide and decomposition temperature, and is generally 0.5 to 10 parts, preferably 1.0 to 5 parts based on 100 parts of the copolymer.

In peroxide vulcanization using the organic peroxide, curing (vulcanization) advances significantly by using an auxiliary vulcanizing agent. Examples of the auxiliary vulcanizing agent are those which have been used conventionally. Examples are triallyl cyanurate, triallyl isocyanurate, triallyl formal, triallyl trimellitate, N,N'-m-phenylene bismaleimide, dipropargyl terephthalate, dially phthalate, tetraallylterephthalate amide and triallyl phosphate and particularly triallyl isocyanurate is preferable. The amount used is generally 0.2 to 10 parts, preferably 0.5 to 5 parts based on 100 parts of the copolymer.

Peroxide vulcanization may be conducted in the conventional manner. For example, there is the method of putting the copolymer obtained by the present invention, a vulcanizing agent and when necessary, an auxiliary vulcanizing agent and any other additive which can be compounded accordingly into a die after roll mixing and raising the pressure to carry out primary vulcanization, and then secondary vulcanization. Usually, the conditions adopted for primary vulcanization are within the ranges of 100° C. to 200° C. in temperature, 5 to 60 minutes in time and 2 to 10 MPa in pressure. The conditions adopted for secondary vulcanization are within the ranges of 150° C. to 300° C. in temperature and 30 minutes to 30 hours in time.

To the composition comprising the copolymer obtained by the present invention, a filler, a processing aid or an antioxidant may be added according to need.

Examples of the filler are metal oxide such as magnesium oxide, calcium oxide, zinc oxide, lead oxide, titanium oxide, iron oxide, silver oxide, chromium oxide, bismuth oxide, silicon oxide, aluminum oxide and copper oxide, metal hydroxide such as magnesium hydroxide, aluminum hydroxide and calcium hydroxide, carbonate such as magnesium carbonate, aluminum carbonate, calcium carbonate and barium carbonate, metal sulfide such as molybdenum disulfide, iron sulfide and copper sulfide, sulfate such as calcium sulfate, aluminum sulfate and barium sulfate and silicate such as magnesium silicate, calcium silicate, sodium silicate and aluminum silicate. Other examples are hydrotalcite, lithopone (a mixture of zinc sulfide and barium sulfate), graphite, carbon black, lampblack, carbon fluoride, calcium fluoride, coke, fluorine resin powder or fiber and carbon fiber.

Chromium oxide, silicon oxide and iron oxide powder which are inorganic powder with a Mohs hardness of at least 6, which are described in JP-A-8-27343 and JP-A-8-151565; polytetrafluoroethylene powder pierced with carbon described in JP-A-7-188500; a fiber prepared with a material having a fluorine resin to which a filler is added as the main component which is described in JP-A-56-151739; a fiber of a material having carbon fiber and fluorine resin as the main component; and calcium metasilicate or graphite which is described in JP-B-5-64177 are preferable from the viewpoint of particularly contributing to the improvement of abrasion resistance, metal adhesion and lubricating properties. Furthermore, carbon black and silicon oxide are preferable in terms of significant improvement in mechanical strength and permanent compression strain.

Examples of the processing aid are higher fatty acid such as stearic acid, oleic acid, palmitic acid and lauric acid, higher fatty acid salt such as sodium stearate and zinc stearate, higher fatty acid amide such as stearic acid amide and oleic acid amide, higher fatty acid ester such as ethyl stearate, butyl stearate, ethyl oleate and butyl oleate, higher fatty acid amine such as stearic acid amine, polyol such as ethylene glycol, glycerine and diethylene glycol, aliphatic hydrocarbon such as vaseline and paraffin and others such as petroleum wax, silicone oil, low molecular weight polyethylene and low molecular weight polypropylene.

Other synthetic rubber can also be blended. Specific examples of the synthetic rubber are acrylic rubber, nitrile rubber, hydrogenated nitrile rubber, silicone rubber, vinylidene fluoride fluorine rubber and ethylene-acrylic monomer copolymer rubber but are not limited to these.

Examples of the antioxidant are 4,4-bis(α,α-dimethylbenzyl)diphenylamine, phenyl-1-naphthylamine, alykylated diphenylamine, octylated diphenylamine, p-(p-toluenesulfonylamide)diphenylamine, N,N'-di-2-naphthyl-p-phenylenediamine, N,N'-diphenyl-p-phenylenediamine, N-phenyl-N'-isopropyl-p-phenylenediamine, N-phenyl-N'-(1,3-dimethylbutyl)-p-phenylenediamine, N-phenyl-N'-(3-methacryloyloxy-2-hydroxypropyl)-p-phenylenediamine, 2,2,4-trimethyl-1,2-dihydroquinoline polymer and tris(nonylphenyl)phosphite.

When radiation vulcanization is employed, an auxiliary vulcanizing agent, filler, processing aid and antioxidant may be added to vulcanize as in peroxide vulcanization.

The vulcanizable composition in which the elastomer obtained by the process of the present invention is used may be molded into molded articles such as a sheet, pipe, rod, tube, angle, channel, cloth product and coating board by continuous molding such as extrusion, transfer, calendar, roll coat, brushing and impregnation in addition to the usual molding using a die. The composition may also be mold processed into profiles and molded articles of a special shape such as spongy rubber by other known molding methods. Also, the composition may be primarily processed into film or tape and then further molded by secondary processing such as laminating, pasting, and wrapping. The composition molded in this manner is vulcanized by the aforementioned vulcanizing measures. In addition, a vulcanization coating can be formed by vulcanizing after applying the composition to the surface of the base material in the state of a solution by coating, impregnating, or spraying; by vulcanization adhesion by laminating the vulcanizable composition in a state of film or sheet; or by adhesion laminating the vulcanized film or sheet to the surface of the base material and thus various vulcanized rubber products can be provided.

The vulcanizate obtained in this way has excellent heat resistance, oil resistance, amine resistance and chemical resistance and can be used for various parts in the automobile, aviation, semiconductor, food and chemical industries. Utilizing the heat resistance, oil resistance and amine resistance, the composition is suitable for oil seal or oil seal parts such as a hose for the engine oil of an automobile. Other favorable molded articles are listed below.

Applications of Molded Articles:

The molded article is suitable for use as packing, O-ring, hose, other sealing material, diaphragm, valve and wire covering material for amine resistance, oil resistance, chemical resistance, steam resistance and weather resistance in transportation means such as automotive, ship and airplane; similar packing, O-ring, sealing material, diaphragm, valve, hose, roll and tube in chemical plant; similar packing, O-ring, hose, sealing material, belt, diaphragm, valve, roll and tube in foods plant and foods processing machine (including domestic appliances); similar packing, O-ring, hose, sealing material, diaphragm, valve and tube in nuclear plant; similar packing, O-ring, hose, sealing material, diaphragm, valve, roll, tube, mandrel, wire covering material, flexible joint, belt, rubber plate and weather strip in general industrial parts; roll blade for PPC copying machine, etc.

More specifically, there are the following applications.

(i) Automotive Applications

The elastomer obtained by the present invention exhibits superior heat resistance and resistance against amine type additive (more specifically succinate imides and metal dialkyl dicarbamates) which are mainly added to automobile oil. In addition, because the volume change is small in relation to the oil, the elastomer is suitable as various parts and molded articles for automobile oil, such as automatic transmission fluid (ATF), engine oil and differential gear oil. More specifically, the elastomer is suitable as material for an elastomer molded article which may possibly come into contact with oil such as sealing material or hose material for engine oil of gasoline and diesel powered vehicles; sealing material or hose material for various transmission oil; sealing material or hose material for various gear oil; and coating material for sensor lines to detect oil environment.

More specifically, (1) For sealing
- Crank shaft seal
- O-ring and gasket for engine cylinder sleeve
- O-ring and gasket for wet cylinder sleeve
- Power piston packing
- Cylinder liner seal
- Valve stem seal
- Front pump seal for automatic transmission
- Rear axle pinion seal
- Gasket for universal joint
- Pinion seal for speed meter
- Piston cup for foot brake
- O-ring and oil seal for torque transmission
- Seal for after-burner for exhaust gas
- Bearing seal
- Differential seal (drive pinion seal, side seal)
- Differential gasket and O-ring
- Oil seal, gasket, O-ring and packing for manual transmission
- Oil seal, gasket, O-ring and packing for automatic transmission
- Oil seal, gasket, O-ring and packing for gearless transmission (belt type or toroidal type)
- Wheel bearing seal
- Seal, gasket and O-ring for radiator
- Seal, gasket and O-ring for oil cooler
- Seal, gasket and O-ring for power steering (2) For hose
- Oil hose for manual transmission
- ATF hose for automatic transmission
- CVTF hose for gearless transmission (belt type or toroidal type)
- EGR tube
- Twin-carburetor tube
- Hose for radiator
- Hose for oil cooler
- Hose for power steering (3) For diaphragm
- Diaphragm for sensor of carburetor (4) For electrical components
- Wire covering material
- Insulating material
- Sheathe
- Cooler hose
- Tube
- Ring
- Packing (5) Other Applications
- Vibration proof rubber (engine mount, exhaust system, etc.)
- Hose for after burner (ii) Applications in Chemical Industries (1) For sealing
- Seals for pump, flow meter and pipe for chemicals
- Seal for heat exchanger
- Packing of glass cooler for sulfuric acid manufacturing equipment
- Seals for sprinkler and transfer pump for agricultural chemicals
- Seal for gas pipe
- Seal for plating solution
- Packing for high temperature vacuum dryer
- Roll seal of belt for paper making
- Seal for fuel battery
- Joint seal for air duct (2) For roll
- Roll having trichlene resistance (for dyeing of fiber)

(3) Other applications
- Acid resistant hose (for concentrated sulfuric acid)
- Packing for joint of tubes for gas chromatograph and pH meter
- Chlorine gas transfer hose
- Rainwater drain hoses for benzene and toluene reservoir tanks
- Seal, tube, diaphragm and valve parts for analyzer and physical and chemical appliances
- Steam hose (iii) Applications in Industrial Machinery (1) For sealing
- Seals for hydraulic and lubricating machine
- Bearing seal
- Seal for dry copying machine
- Seals for window, etc. of dry cleaner
- Seal for equipment for concentrating uranium hexafluoride
- Seal (vacuum) valve for cyclotron
- Seal for automatic packaging machine (2) Other applications
- Rolls, scraper, tube and valve parts for printing equipment
- Rolls, scraper, tube and valve parts for coating equipment
- Ink tube, roll and belt for printer
- Belt and rolls for dry copying machine
- Diaphragms for pumps for analyzing sulfurous acid gas and chlorine gas in the air (environmental pollution-related meters)
- Rolls and belt for printer
- Squeeze rolls for pickling
- Pipe, hose and flexible joint for dry-cleaning machine (iv) Airplane Applications
- Valve stem seal for jet engine
- Fuel feeding hose, gasket and O-ring
- Rotating shaft seal
- Gasket for hydraulic equipment
- Seal for fire wall (v) Ship Applications
- Stern seal for screw propeller shaft
- Suction and exhaust valve stem seals for diesel engine
- Valve seal for butterfly valve
- Stem seal for butterfly valve (vi) Food and Medicine Applications
- Seal for plate heat exchanger
- Solenoid valve seal for vending machine
- Plugs for chemicals
- Rubber material for food processing machine (for example sealing material such as a gasket, diaphragm and O-ring for an heat exchanger, pipe, hose, sanitary packing, valve packing and filler packing used as a joint between the mouth of the bottle and the filler when filling)

Packing, gasket, tube, diaphragm, hose and joint sleeve for filling device, sterilizing device and brewing device of alcoholic and carbonated beverage products, water heater and various automatic food vending machines (vii) Electrical Applications Insulation oil cap for a train of the Shinkansen line Venting seal for liquid ring transmission Jacket for oil well cable Electric insulating material (for example material used for insulating spacer for various electric appliances and insulating tape and heat contracting tube which is used for the joint and terminal part of cables)

Material for electronic and electric devices used in a high temperature atmosphere (for example lead wire material for motor, wire material for high heat oven)

Further the molded article obtained above can be used for O-ring, sealing material, hose, tube, diaphragm, roll, lining and coating in equipment for producing semiconductor, liquid crystal panel, plasma display panel, plasma address liquid crystal panel, field emission display panel, substrate for solar battery, etc., for example, CVD equipment, etching equipment, oxidation/diffusion equipment, sputtering equipment, ashing equipment, ion implantation equipment, exhausting equipment, and the like which require plasma resistance; O-ring, sealing material, hose, tube, diaphragm and roll in wet etcher, cleaning equipment, pipes for chemicals, gas pipes, and the like which require chemical resistance; and further O-ring, sealing material, hose, tube, diaphragm and roll to be used on parts of the mentioned equipment which are required to be free from dust and metal.

Examples of other applications where chemical resistance is required are O-ring, sealing material, hose, tube, diaphragm of pump for resist developing solution, releasing solution and wafer cleaning solution and wafer transferring rolls in production equipment for semiconductor, liquid crystal panel, plasma display panel, etc.

Furthermore, there are other examples of using by forming a vulcanization covering as mentioned before. More specifically, examples are listed below.

Non-adhesive oil resistant roll for copying machine

Weather strip for weather resistance and freeze prevention

Rubber plug for fluid infusion

Vial rubber plug

Mold-releasing agent

Non-adhesive carrier belt

Adhesion preventing covering for the pre gasket of the automobile engine mount

Coating of synthetic fiber

Bolt member or joint having thin layer of coating of packing

Hereinafter, the present invention is explained in detail by means of examples, but is not limited thereto.

EXAMPLE 1

A 3 l stainless steel autoclave was charged with 1.5 l of ion exchanged water and 75 g of ammonium perfluorooctanate. After sufficiently replacing with nitrogen, the autoclave was charged with 830 g of hexafluoropropylene (HFP) in a vacuum state. The temperature within the autoclave was raised to 65° C. and then 17 g of ethylene was press fitted thereto until the pressure within the autoclave became 2.4 MPaG (24.5 kg/cm$^2$G). The autoclave was left until the pressure became constant while stirring the polymerization system with an electromagnetic stirrer. Then a solution obtained by dissolving 0.45 g of ammonium persulfate (APS) into water was press fitted thereto by nitrogen gas to start the reaction. The pressure decreases as the reaction progresses and this decrease in pressure was compensated by adding ethylene and HFP. The reaction was conducted at a constant pressure and temperature for 80 hours. A total of 5.3 g of APS was added until the reaction was finished.

After the reaction was finished, the remaining monomers were released into the air and the obtained emulsified dispersion body was coagulated with calcium chloride aqueous solution, then washed with ion exchanged water and dried at 120° C. until a constant weight was reached to obtain 490 g of the elastomeric polymer product. The polymerization rate was 4 g/hr/liter-water.

The composition of the copolymer, molecular weight and glass transition temperature of the product obtained by the polymerization were measured by the analyzing method of $^1$H-NMR, GPC and DSC. The product was a copolymer of 54.9% by mole of ethylene and 45.1% by mole of HFP, the number average molecular weight was 19,000 (on a polystyrene basis), and the weight average molecular weight was 36,000. The fluorine content was 61.9% by weight and the glass transition temperature was −4° C. Also, when the Mooney viscosity was measured according to the following method, Mooney viscosity ML (1+4, 100° C.) was 36 and ML (1+10, 100° C.) was 28.

(Mooney Viscosity)

The Mooney viscosity was measured according to ASTM-D1646 and JIS K6300.

Measurement instrument: Automatic Mooney viscosity meter made by Ueshima Seisakusho Co., Ltd.

Rotation number of rotor: 2 rpm

Measurement temperature: 100° C.

EXAMPLE 2

A 47 l stainless steel autoclave was charged with 23.5 l of ion exchanged water, 1,175 g of ammonium perfluorooctanate, 185 g of hydrogen phosphate disodium salt 12 hydrate, 18.8 g of sodium hydroxide, 58 g of Perbutyl PV (containing 70% by weight of t-butyl peroxypivalate, available from NOF Corporation) and 865 g of t-butanol. After sufficiently replacing with nitrogen, the autoclave was charged with 13.02 g of hexafluoropropylene (HFP) in a vacuum state and the temperature was set to 15° C. 411 g of a mixed gas of ethylene/tetrafluoroethylene (ethylene 87.7% by mole) was press fitted thereto until the pressure within the autoclave became 0.85 MPaG (8.5 kgf/cm$^2$G). The autoclave was left until the pressure became constant while stirring the polymerization system with an electromagnetic stirrer.

0.276 g of iron (II) sulfate 7 hydrate, 0.326 g of disodium ethylenediaminetetraacetate 2 hydrate and 46 g of sodium hydroxymethane sulfinate 2 hydrate was dissolved into 800 g of ion exchanged water and the resulting solution was subjected to bubbling by nitrogen gas. The autoclave was then charged with this solution by a plunger pump to start the reaction. The pressure decreases as the reaction progresses and this decrease in pressure was compensated by adding a mixed gas of ethylene/tetrafluoroethylene (ethylene 91.7% by mole). The reaction was conducted at a constant pressure and temperature for 33.5 hours.

After the reaction was finished, the remaining monomers were released into the air and the obtained emulsified dispersion body was coagulated with a calcium chloride aqueous solution, then washed with ion exchanged water and dried at 120° C. until a constant weight was reached to obtain 5,600 g of the elastomeric polymer product. The polymerization rate was 7.1 g/hr/liter-water.

The composition of copolymer of the product obtained by the polymerization was measured by $^1$H-NMR and $^{19}$F-NMR, and the molecular weight and glass transition temperature of the product were measured in the same manner as in Example 1. The composition was ethylene/hexafluoropropylene/tetrafluoroethylene=54.1/40.7/5.2% by mole, the number average molecular weight was 28,000 (on a polystyrene basis), and the weight average molecular weight was 45,000 (on a polystyrene basis). The fluorine content was 61.9% by weight and the glass transition temperature was +2° C. Also, the Mooney viscosity ML (1+4, 100° C.) was 147, ML (1+10, 100° C.) was 128.

COMPARATIVE EXAMPLE 1

290 g of the elastomeric E-HFP copolymer was obtained in the same manner as in Example 1 except that a 2 l autoclave was used and charged with 890 g of ion exchanged water and 44 g of ammonium perfluorooctanate, the initially charged amounts of ethylene and HFP were respectively 70 g and 550 g, the polymerization temperature was 65° C. and the polymerization pressure was 5.88 MPa. The polymerization rate was 15 g/hr/liter-water.

The copolymer composition, molecular weight and glass transition temperature were measured in the same manner as in Example 1. The product was a copolymer of 65% by mole of ethylene and 35% by mole of HFP, the number average molecular weight was 110,000 (on a polystyrene basis), and the weight average molecular weight was 910,000. The fluorine content was 56.3% by weight and the glass transition temperature was −7.3° C. Also, the Mooney viscosity ML (1+4, 100° C.) was 100 and ML (1+10, 100° C.) was 94.

COMPARATIVE EXAMPLE 2

A 47 l stainless steel autoclave was charged with 23.5 l of ion exchanged water, 470 g of ammonium perfluorooctanate, 185 g of hydrogen phosphate disodium salt 12 hydrate, 18.8 g of sodium hydroxide, 58 g of Perbutyl PV (containing 70% by weight of t-butyl peroxypivalate, available from NOF Corporation) and 865 g of t-butanol. After sufficiently replacing with nitrogen, the autoclave was charged with 13.02 g of hexafluoropropylene (HFP) in a vacuum state and the temperature was set to 15° C. Then 1,622 g of ethylene was press fitted thereto until the pressure within the autoclave became 2.2 MPaG. The autoclave was left until the pressure became constant while stirring the polymerization system with an electromagnetic stirrer.

0.359 g of iron (II) sulfate 7 hydrate, 0.423 g of disodium ethylenediaminetetraacetate 2 hydrate and 46 g of sodium hydroxymethane sulfinate 2 hydrate were dissolved into 800 g of ion exchanged water and the resulting solution was subjected to bubbling by nitrogen gas. The autoclave was then charged with this solution by a plunger pump to start the reaction. The pressure decreases as the reaction progresses and this decrease in pressure was compensated by adding ethylene. The reaction was conducted at a constant temperature and pressure for 36 hours.

After the reaction was finished, the remaining monomers were released into the air and the obtained emulsified dispersion body was coagulated with a calcium chloride aqueous solution, then washed with ion exchanged water and dried at 120° C. until a constant weight was reached to obtain 5,500 g of the elastomeric polymer product. The polymerization rate was 6.5 g/hr/liter-water.

The composition of the product obtained by the polymerization was measured by $^1$H-NMR and $^{19}$F-NMR, and the molecular weight and glass transition temperature of the product were measured in the same manner as in Example 1. The composition was ethylene/hexafluoropropylene=63.9/36.1% by mole, the number average molecular weight was 112,000 (on a polystyrene basis), and the weight average molecular weight was 873,000 (on a polystyrene basis). The fluorine content was 57.1% by weight and the glass transition temperature was −7° C. Also, the Mooney viscosity ML (1+4, 100° C.) was 99 and ML (1+10, 100° C.) was 84.

EXAMPLE 3

A 3 l stainless steel autoclave was charged with 1.5 l of ion exchanged water, 75 g of ammonium perfluorooctanate, 1.2 g of sodium hydroxide, 11.8 g of disodium hydrogen phosphate 12 hydrate, 55.2 g of t-butyl alcohol and 3.68 g of Perbutyl PV (containing 70% by weight of t-butyl peroxypivalate, available from NOF Corporation). After sufficiently replacing with nitrogen, the autoclave was charged with 826 g of hexafluoropropylene (HFP) in a vacuum state and the temperature was set to 15° C. 26 g of an ethylene/TFE monomer mixture (87.7/12.3% by mole) mixed in advance was press fitted thereto until the pressure within the autoclave reached 0.85 MPa·G. The autoclave was left until the temperature was 15° C. and the pressure became constant (0.85 MPa-G) while stirring the polymerization system with an electromagnetic stirrer. When the temperature and the pressure became constant, an aqueous solution obtained by dissolving 0.018 g of iron (II) sulfate 7 hydrate, 0.021 g of disodium ethylenediaminetetraacetate 2 hydrate and 2.9 g of sodium hydroxymethane sulfinate 2 hydrate into 50 g of ion exchanged water was subjected to bubbling by nitrogen gas and the autoclave was then charged with this solution by a plunger pump to start the reaction.

The pressure decreases as the reaction progresses and this decrease in pressure was compensated by adding the ethylene/TFE monomer mixture (91.7/8.3% by mole). The reaction was conducted at a constant temperature and pressure (15° C., 0.85 MPa·G) for 31.25 hours.

After the reaction was finished, the remaining monomers were released into the air and the obtained emulsified dispersion body was coagulated by hydrochloric acid, then washed with ion exchanged water and dried at 120° C. until a constant weight was reached to obtain 330 g of the elastomeric polymer product. The average polymerization rate was 7 g/hr/liter-water.

The composition of copolymer, molecular weight and glass transition temperature of this E-HFP-TFE copolymer were measured in the same manner as in Example 1. The product was a copolymer of 54.0% by mole of ethylene, 40.4% by mole of HFP and 5.6% by mole of TFE, the number average molecular weight (on a polystyrene basis) was 44,000, and the weight average molecular weight was 62,000. The fluorine content was 61.9% by weight and the glass transition temperature was +2° C. Also, the Mooney viscosity ML (1+4, 100° C.) was 149 and ML (1+10, 100° C.) was 138.

EXAMPLE 4

A 6 l stainless steel autoclave was charged with 3 l of ion exchanged water, 150 g of ammonium perfluorooctanate, 2.4 g of sodium hydroxide, 24 g of disodium hydrogen phosphate 12 hydrate, 108 g of t-butyl alcohol and 7.6 g of Perbutyl PV (containing 70% by weight of t-butyl peroxypivalate, available from NOF Corporation). After sufficiently replacing with nitrogen, the autoclave was charged with 1,640 g of hexafluoropropylene (HFP) in a vacuum state and the temperature was set to 15° C. 34 g of ethylene was press fitted thereto until the pressure within the autoclave reached 0.85 MPa·G. The autoclave was left at 15° C. until the pressure became constant (0.85 MPa·G) while stirring the polymerization system with an electromagnetic stirrer. When the temperature and the pressure became constant, an aqueous solution obtained by dissolving 0.011 g of iron (II) sulfate 7 hydrate, 0.015 g of disodium ethylenediaminetetraacetate 2 hydrate and 5.7 g of sodium hydroxymethane sulfinate 2 hydrate into 100 g of ion exchanged water was subjected to bubbling by nitrogen gas and the autoclave was then charged with this solution by a plunger pump to start the reaction.

The pressure decreases as the reaction progresses and this decrease in pressure was compensated by adding ethylene. The reaction was conducted at a constant temperature and pressure (15° C., 0.85 MPa·G) for 66 hours.

After the reaction was finished, the remaining monomers were released into the air and the obtained emulsified dispersion body was coagulated with hydrochloric acid, then washed with ion exchanged water and dried at 120° C. until a constant weight was reached to obtain 540 g of the elastomeric polymer product. The average polymerization rate was 3 g/hr/liter-water.

The composition of the copolymer, molecular weight and glass transition temperature of this E-HFP copolymer were measured in the same manner as in Example 1. The product was a copolymer of 54.3% by mole of ethylene and 45.7% by mole of HFP, the number average molecular weight (on a polystyrene basis) was 26,000, and the weight average molecular weight was 37,000. The fluorine content was 62.1% by weight and the glass transition temperature was −5° C. Also, the Mooney viscosity ML (1+4, 100° C.) was 100 and ML (1+10, 100° C.) was 92.

EXAMPLES 5 TO 8 AND COMPARATIVE EXAMPLES 3 TO 5

The elastomeric copolymer prepared respectively in Examples 1 to 4 and Comparative Examples 1 and 2 was used. To 100 parts of the copolymer were added 30 parts of carbon black (MT-C), 3.7 parts of peroxide type vulcanizing agent (Perbutyl Z), 2.5 parts of auxiliary vulcanizing agent (triallyl isocyanurate, available from Nippon Kasei Chemical Co., Ltd.) and 3 parts of oxygen receiver (MgO). Kneading was then conducted at room temperature using an open roll and the compound of the obtained composition was represented as Compound A.

In addition, compounding and kneading was conducted in the same manner as in Compound A except that the oxygen receiver (MgO) was not mixed, and the compound of the obtained composition was represented as Compound B.

Both of the compounds had good adhesion to the roll and could be kneaded easily. The obtained rubber compound was put in a die, primarily vulcanized by press vulcanization and then secondarily vulcanized by oven vulcanization to prepare the vulcanizate.

The properties under normal conditions, oil resistance, amine resistance and heat resistance of the obtained vulcanizate were measured by the following method. The results are shown in Table 1.

(Properties Under Normal Conditions)

Tensile strength at break (TB) and tensile elongation at break (EB) are measured according to JIS K6251 (1993).

(Oil Resistance)

The volume change (%) after impregnating in the following oil for the time shown in Table 1 at 175° C. is measured.

Types of Oil:
 Engine oil A: ASTM SF105G
 Engine oil B: IRM903
 ATF oil: DEXRON III (available from TEXACO)
 Differential oil based on Ford Motor Company specification:
  a mixture of M2C118A/M2C192A=6/94 (in weight ratio)
 M2C118A is STURACO 7098LO available from D. A. Stuart Co., Ltd. and M2C192A is FORD M2C192-A, 75W-140 available from CITGO Petroleum Co., Ltd.

(Amine Resistance)

The tensile strength change (%) after immersing in Engine oil A (ASTM SF105G) for 336 hours at 175° C. is measured.

(Heat Resistance)

The tensile strength change (%) after 175° C.×336 hours, 200° C.×336 hours and 230° C.×70 hours of exposure in the air is measured.

TABLE 1

| Ex. No. | Ex. 5 | Ex. 6 | Ex. 7 | Ex. 8 | Com. Ex. 3 | Com. Ex. 4 | Com. Ex. 5 |
|---|---|---|---|---|---|---|---|
| Copolymer used | Ex. 1 | Ex. 2 | Ex. 3 | Ex. 4 | Com. Ex. 1 | Com. Ex. 1 | Com. Ex. 2 |
| Compound | A | B | B | B | A | B | B |
| HFP content (% by mole) | 45.1 | 40.7 | 40.4 | 45.7 | 34.8 | 34.8 | 36.1 |
| TFE content (% by mole) | 0 | 5.3 | 5.6 | 0 | 0 | 0 | 0 |
| Fluorine content (% by weight) | 61.9 | 61.9 | 61.9 | 62.2 | 56.3 | 56.3 | 57.1 |
| Mooney viscosity | | | | | | | |
| ML (1 + 4, 100° C.) | 36 | 147 | 149 | 100 | 100 | 100 | 99 |
| ML (1 + 10, 100° C.) | 28 | 128 | 138 | 92 | 95 | 95 | 84 |
| Property under normal condition | | | | | | | |
| TB (MPaG) | 10 | 18.6 | 17.9 | 12 | 16.5 | 15.4 | 20.4 |
| EB (%) | 270 | 330 | 260 | 410 | 170 | 190 | 240 |
| Oil resistance | | | | | | | |
| (Volume change (%)) (175° C.) | | | | | | | |
| Engine oil A (immersed for 336 hours) | — | 3 | — | — | 7 | — | 6 |
| Engine oil B (immersed for 72 hours) | 6 | — | — | — | — | — | — |
| ATF oil (immersed for 336 hours) | — | 3 | 4 | 5 | 9 | 8 | 6 |

TABLE 1-continued

| Ex. No. | Ex. 5 | Ex. 6 | Ex. 7 | Ex. 8 | Com. Ex. 3 | Com. Ex. 4 | Com. Ex. 5 |
|---|---|---|---|---|---|---|---|
| Differential oil based on Ford Motor Company specification (immersed for 72 hours) | 4 | — | — | — | 10 | — | — |
| Differential oil based on Ford Motor Company specification (immersed for 336 hours) | — | 4 | 5 | 5 | 28 | 10 | 9 |
| Amine resistance (Tensile strength change (%)) (336 hours) | — | −12 | — | — | 5 | — | −12 |
| Heat resistance (Tensile strength change (%)) | | | | | | | |
| 175° C. × 336 hours | — | −5 | — | — | — | — | −21 |
| 200° C. × 336 hours | — | −17 | — | — | — | — | −51 |
| 230° C. × 70 hours | −17 | — | −25 | −37 | −60 | −55 | −48 |

INDUSTRIAL APPLICABILITY

The present invention provides an E-HFP copolymer having sufficient amine resistance, while maintaining heat resistance, oil resistance and chemical resistance close to that of conventional fluorine rubber and a vulcanizate which is suitable for an oil seal or hose for engine oil.

We claim

1. An ethylene-hexafluoropropylene copolymer comprising 35 to 60% by mole of ethylene structural unit, 25 to 50% by mole of hexafluoropropylene structural unit and 0 to 15% by mole of structural unit derived from a monomer copolymerizable therewith; said copolymer having a fluorine content of at least 60% by weight and a number average molecular weight of 3,000 to 500,000.

2. The copolymer of claim 1, wherein said copolymerizable monomer is at least one member selected from the group consisting of tetrafluoroethylene, chlorotrifluoroethylene, perfluoro(alkyl vinyl ether), trifluoroethylene, vinyl fluoride and propylene.

3. The copolymer of claim 1, wherein said copolymer comprises 45 to 60% by mole of ethylene structural unit, 35 to 50% by mole of said hexafluoropropylene structural unit and 1 to 10% by mole of tetrafluoroethylene structural unit.

4. The copolymer of claim 1, wherein said copolymer has a Mooney viscosity (1+4, 100° C.) of 60 to 200.

5. A vulcanizable composition comprising the ethylene-hexafluoropropylene copolymer of any of claims 1 to 4 and a vulcanizing agent.

6. An elastomeric vulcanizate obtained by vulcanizing the vulcanizable composition of claim 5.

7. The elastomeric vulcanizate of claim 6 which is sealing material or hose material for an automobile.

* * * * *